US011923587B2

(12) United States Patent
Khripkov et al.

(10) Patent No.: US 11,923,587 B2
(45) Date of Patent: Mar. 5, 2024

(54) TRANSMISSION LINE FOR RADIOFREQUENCY RANGE CURRENT

(71) Applicant: Huawei Technologies Co., Ltd., Shenzhen (CN)

(72) Inventors: Alexander Khripkov, Helsinki (FI); Ville Viikari, Aalto (FI); Resti Montoya Moreno, Aalto (FI); Juha Ala-Laurinaho, Aalto (FI); Janne Ilvonen, Helsinki (FI); Jari Kristian Van Wonterghem, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 17/433,916

(22) PCT Filed: Feb. 25, 2019

(86) PCT No.: PCT/EP2019/054536
§ 371 (c)(1),
(2) Date: Aug. 25, 2021

(87) PCT Pub. No.: WO2020/173537
PCT Pub. Date: Sep. 3, 2020

(65) Prior Publication Data
US 2022/0158318 A1 May 19, 2022

(51) Int. Cl.
*H01P 1/203* (2006.01)
*H01Q 1/24* (2006.01)
(Continued)

(52) U.S. Cl.
CPC ......... *H01P 1/20363* (2013.01); *H01Q 1/243* (2013.01); *H01Q 1/521* (2013.01); *H01Q 5/307* (2015.01); *H01Q 21/28* (2013.01)

(58) Field of Classification Search
CPC ...... H01P 5/10; H01P 3/16; H01P 5/02; H01P 1/2013; H01P 1/20; H01P 5/16;
(Continued)

(56) References Cited

U.S. PATENT DOCUMENTS 3,805,198 A * 4/1974 Gewartowski .......... H01P 3/085 333/204
5,017,897 A 5/1991 Ooi et al.
(Continued)

FOREIGN PATENT DOCUMENTS

| | | | |
|---|---|---|---|
| CN | 206076482 | U | 4/2017 |
| CN | 207781895 | U | 8/2018 |
| WO | 2018206116 | A1 | 11/2018 |

OTHER PUBLICATIONS

Park et al., "Hybrid Antenna Module Concept for 28 GHz 5G Beamsteering Cellular Devices," total 3 pages, Institute of Electrical and Electronics Engineers, New York, New York, IEEE (2018).

*Primary Examiner* — John W Poos
(74) *Attorney, Agent, or Firm* — Leydig, Voit & Mayer, Ltd.

(57) ABSTRACT

A transmission line for transmitting radiofrequency range current between a first conductive element and a second conductive element, the transmission line comprising a signal current line and at least one return current line, the signal current line and the return current line(s) extending in parallel. Each current line comprises at least one first segment and at least one second segment. Each first segment is partially aligned with at least one adjacent second segment, aligned segments being separated by a first dielectric gap, and each aligned first segment and second segment forming a capacitive coupling across the first dielectric gap. This solution enables a transmission line which provides only small capacitive loading onto its surroundings, and which therefore can extend, e.g., through an antenna element
(Continued)

without significantly affecting the performance of the antenna element.

15 Claims, 7 Drawing Sheets

(51) Int. Cl.
*H01Q 1/52* (2006.01)
*H01Q 5/307* (2015.01)
*H01Q 21/28* (2006.01)

(58) Field of Classification Search
CPC .... H01P 1/20363; H01Q 1/243; H01Q 1/521; H01Q 5/307; H01Q 21/28
See application file for complete search history.

(56) References Cited

U.S. PATENT DOCUMENTS

| | | | | |
|---|---|---|---|---|
| 5,770,987 | A * | 6/1998 | Henderson ............ | H01P 1/2013<br>333/204 |
| 5,825,263 | A * | 10/1998 | Falt ..................... | H01P 1/20363<br>333/204 |
| 6,034,580 | A | 3/2000 | Henderson et al. | |
| 8,791,775 | B2 * | 7/2014 | Liu ......................... | H01L 28/10<br>333/204 |
| 9,859,604 | B2 * | 1/2018 | Huang ...................... | H01P 5/10 |
| 2017/0110787 | A1 | 4/2017 | Ouyang et al. | |
| 2018/0026341 | A1 | 1/2018 | Mow et al. | |

* cited by examiner

TRANSMISSION LINE FOR RADIOFREQUENCY RANGE CURRENT

CROSS-REFERENCE TO RELATED APPLICATIONS

This application is a National Stage of International Patent Application No. PCT/EP2019/054536, filed on Feb. 25, 2019, which is hereby incorporated by reference in its entirety.

TECHNICAL FIELD

The disclosure relates to a transmission line for transmitting radiofrequency range current between a first conductive element and a second conductive element.

BACKGROUND

Future electronic devices need to support millimeter-wave bands, e.g. 28 GHz and 42 GHz, as well as sub-6 GHz bands in order to accommodate increased data rates. However, the volume reserved for all the antennas in a mobile electronic device is very limited and the added millimeter-wave antennas should ideally be accommodated to the same volume as the sub-6 GHz antennas. Increasing the volume reserved for antennas would make the electronic device larger, bulkier, and less attractive to users. Current millimeter-wave antennas either require such additional volume, or if placed in the same volume, significantly reduce the efficiency of sub-6 GHz antennas.

Current sub-6 GHz antennas are located on the metal frame of the electronic device and are of a capacitive coupling element type, a section of the metal frame being used as a capacitive coupling element antenna. The capacitive coupling element must be separated from the main conductive body of the device by a dielectric gap. The larger the gap between the metal frame and the main body, the better the performance of the sub-6 GHz antenna.

One drawback with currently known millimeter-wave antennas for metal frame electronic devices is that the millimeter-wave antenna short-circuits the metal frame, or causes a significant capacitive loading to it. The capacitive loading effectively decreases the gap between the capacitive coupling element antenna and the main body and thus deteriorates the operation of the sub-6 GHz antenna. Short-circuiting the metal frame also deteriorates the performance of the sub-6 GHz antenna.

Millimeter-wave antennas are conventionally placed as far as possible from the metal frame in order to not introduce additional capacitive loading. However, if the antenna is placed far from the frame, the radiation opening in the metal frame has to be comparatively large, and large openings in the metal frame to be avoided due to both aesthetic reasons and mechanical robustness. Furthermore, radiation from millimeter-wave antennas placed far from the frame is shadowed by the conductive components of the mobile device, which results in millimeter-wave beamforming deflecting, and thus limited beam coverage Additionally, the trend towards very large displays, covering as much as possible of the electronic device, makes the space available for the different antennas very limited, forcing either the size of the antenna array to be significantly reduced, and its performance impaired, or a large part of the display to be inactive.

SUMMARY

Exemplary embodiments of the present disclosure provide an improved transmission line.

According to a first aspect, there is provided a transmission line for transmitting radiofrequency range current between a first conductive element and a second conductive element, the transmission line comprising a signal current line and at least one return current line, the signal current line and the return current line(s) extending in parallel, each current line comprising at least one first segment and at least one second segment, each first segment being partially aligned with at least one adjacent second segment, aligned segments being separated by a first dielectric gap, each aligned first segment and second segment forming a capacitive coupling across the first dielectric gap.

This solution enables a transmission line which provides only small capacitive loading onto its surroundings, and which therefore can extend, e.g., through an antenna element formed by the first conductive element and the second conductive element without significantly affecting the performance of the antenna element. The capacitance is minimized by one or several dielectric gaps to both the signal current line and the return current line of the transmission line. Conventionally, signal lines can be equipped with gaps in case of filters, whereas return current lines are not provided with dielectric gaps because unbalanced lines are commonly used. However, in the present solution, balanced line with gaps both on signal and return paths are introduced to avoid short circuiting through the return path. The transmission line enables allocation of the millimeter-wave antennas at the second conductive element while feeding the millimeter-wave antennas by radio circuits allocated at first conductive element. Some embodiments comprise millimeter-wave antennas coupled to the second conductive element and fed by the disclosed transmission lines across the gap between the first and the second conductive element. Further embodiments configure sub-6 GHz antennas utilizing the same first and second conductive elements. Thus, the disclosed transmission line enables both sub-6 GHz antennas and millimeter-wave antennas utilizing effectively the same volume.

In a possible implementation form of the first aspect, the first segment(s) and the second segment(s) are arranged in a first plane, each first segment partially overlapping at least one adjacent second segment, aligned and overlapping segments being separated by the first dielectric gap in a first direction within the first plane, facilitating a spatially efficient solution which comprises as many dielectric gaps as necessary in order to produce low series capacitance. The capacitance of the gap between the first conductive element and the second conductive element is minimized by a sequence comprising first segment(s), and the second segment(s) are separated by a sequence of first dielectric gap(s), i.e. a sequence of series capacitances. Hence, the performance of the sub-6 GHz antenna is maximized.

In a further possible implementation form of the first aspect, each overlap between a first segment and a second segment generates an electromagnetic coupling enabling transmission above 10 GHz frequencies and which generates electromagnetic isolation, between the first segment and the second segment, below 10 GHz. The larger the dielectric gaps, the smaller the common mode capacitance and the less the transmission line affects its surroundings.

In summary, the disclosed transmission line, comprising a signal current line and at least one return current line and wherein each line comprises overlaps between a first segment and a second segment provides the following features. The common mode capacitance between the first conductive element and the second conductive element is minimized, thus enabling high performance sub-6 GHz antennas. The differential mode transmission loss is minimized above 10 GHz frequencies, thus enabling high performance millimeter-wave antennas. Out-of-band emissions from the millimeter-wave antennas are efficiently suppressed by the frequency-selective performance of the disclosed transmission line, thus assuring compliance of an electronic device, comprising such a transmission line, to corresponding emission standards.

In a further possible implementation form of the first aspect, each first segment and each second segment has a longitudinal extension of λ/16 to 3*λ/4, λ being a wavelength within the radiofrequency range. Each series capacitance of each dielectric gap is compensated with inductance of the corresponding first and second segments. Hence, the signal propagates along the transmission line without significant attenuation. When the capacitances are interleaved with inductive sections, the parasitic loading on the surrounding element is reduced and, if the surrounding element is a sub-6 GHz antenna, its operational bandwidth and efficiency is increased.

In a further possible implementation form of the first aspect, the first segment(s) further extend in a second plane and the second segment(s) further extend in a third plane, the second plane being parallel with the third plane, the second plane and the third plane being perpendicular to the first plane, allowing an as dense yet efficient transmission line as possible. The further extension in the second plane and in the third plane for the signal current line segments and for the return current line segments defines the type of transmission line. In some embodiments, two return current lines are configured with the signal current line in-between adjacent return current lines. This type of transmission line operates as a coplanar waveguide. The dimensions of the first segment(s) and the second segment(s) in the third plane as well as the spacing between signal current line segments and return current lines segments define the wave impedance of the coplanar waveguide transmission line. In alternative embodiments, one return current line is configured adjacent to the signal current line. This type of the transmission line operates as a differential balanced waveguide. The dimensions of the first segment(s) and the second segment(s) in the second and in the third plane, respectively, as well as the spacing between signal current line segments and the return current lines segments define the wave impedance of the differential balanced waveguide transmission line. In all embodiments, the wave impedances of the transmission line are defined by the dimensions of the first segment(s) and the second segment(s), minimizing the differential mode transmission loss above 10 GHz frequencies, thus enabling high performance millimeter-wave antennas.

In a further possible implementation form of the first aspect, each first segment is separated from an adjacent first segment by a second dielectric gap in a first direction within the second plane, and each second segment is separated from an adjacent second segment by a second dielectric gap in a first direction within the third plane, further minimizing the common mode capacitance between the first conductive element and the second conductive element. In some embodiments, the first segment(s) comprised in the signal current line are separated from adjacent first segment(s) comprised in the return current line by a second dielectric gap. The gap defines the wave impedance of the transmission line, thus minimizing differential mode transmission loss above 10 GHz frequencies, and enabling high performance millimeter-wave antennas.

In a further possible implementation form of the first aspect, the first segment(s) of the signal current line and the first segment(s) of the return current line(s) extend in parallel in the second plane, and the second segment(s) of the signal current line and the second segment(s) of the return current line(s) extend in parallel in the third plane, allowing both the signal current line and the return current line to be arranged in the same two parallel planes and the structure to be essentially two-dimensional due to the small distance between the two planes. This topology reduces the volume occupied by the transmission line, thus reducing the volume of the antenna within the electronic device.

In a further possible implementation form of the first aspect, the transmission line comprises one signal current line and one return current line, facilitating a balanced transmission line suitable for, e.g., balanced antennas.

In a further possible implementation form of the first aspect, each current line comprises one first segment and one second segment, the first segment being additionally separated from the second segment by a third dielectric gap in a second direction within the first plane, the second direction being perpendicular to the first direction, allowing the signal current line to extend in one plane and the return current line to extend in a further, parallel plane and the structure to be essentially three-dimensional. This topology further reduces the volume occupied by the transmission line, thus reducing the volume of the antenna within the electronic device.

In a further possible implementation form of the first aspect, the transmission line comprises one signal current line and two return current lines, the signal current line extending between the two return current lines, which is advantageous since transitions between conventional ungrounded coplanar waveguide and grounded transmission lines have low loss wide frequency band performance and occupies minimum volume. This topology also provides highly confined electric fields in the line, isolating the line from its environment.

In a further possible implementation form of the first aspect, the signal current line and the return current line are connected by a first conductive structure and a second conductive structure, a transmission line gap extending between the first conductive structure and the second conductive structure, the transmission line gap dividing the transmission line into a first transmission line part and a second transmission line part, the first conductive structure and the second conductive structure forming an inductive coupling between the first transmission line part and the second transmission line part. Relying on inductive coupling instead of capacitive coupling to transfer the signal may be advantageous since inductive loading generally predominates when designing a matching circuit for capacitive coupling elements. Furthermore, high frequency selectivity is enabled by inductive coupling between the first transmission line part and the second transmission line part, with impedance matching configured by the resonant capacitive gaps between the first and second segments. The high frequency selectivity efficiently suppresses out-of-band emissions from the millimeter-wave antennas, thus assuring compliance of the electronic device to corresponding emission standards.

According to a second aspect, there is provided an electronic device comprising a first conductive element and a second conductive element separated by a non-conductive volume, a first antenna and a second antenna configured at least partially within the non-conductive volume and/or the second conductive element, a first transmission line connecting the first conductive element to the first antenna across the non-conductive volume, and at least one second transmission line according to the above connecting the first conductive element to the second antenna across the non-conductive volume, each second transmission line introducing a parasitic capacitive load below 0.2 pF to a space formed by the non-conductive volume. The disclosed transmission line enables both a first antenna and a second antenna effectively utilizing the same volume.

Conventionally, return current lines are not provided with dielectric gaps since such an interruption in current is undesired due to it generating unintentional radiation which reduces the efficiency of the element comprising the return current line 5. However, in the present solution, such radiation may form part of the radiofrequency radiation generated by the first antenna and the second antenna. By allowing said transmission line to extend across the non-conductive volume, which volume forms part of the first antenna, two different antennas can be placed within the same volume, significantly reducing the space required for antennas within the electronic device.

In a possible implementation form of the second aspect, the electronic device further comprises a display, the first conductive element being a device chassis or a printed circuit board, the second conductive element being a metal frame, the display and the metal frame at least partially surrounding the device chassis and the printed circuit board, wherein radiofrequency radiation generated by the first antenna and the second antenna is transmitted through a dielectric gap separating the display and the metal frame. The present solution is suitable for solid metal frame electronic devices, in which no slots or cuts are required. Radiation is transmitted using the gap between display and metal frame, which enables display direction and end-fire beamforming and hence full-sphere omni coverage which is not blocked by the hand of the user of the electronic device. Furthermore, a ground plane of a conventional transmission line is not needed, and therefore the metal frame is not shorted.

In a further possible implementation form of the second aspect, the first antenna is a sub-6 GHz antenna, facilitating use of the present solution for current cellular bands and networks.

In a further possible implementation form of the second aspect, the second antenna is a millimeter-wave antenna, and a millimeter-wave antenna module is arranged between the first conductive element and the second conductive element. This solution enables the coexistence of sub-6 GHz antennas with millimeter-wave antennas, since the transmission line facilitates transfer of millimeter-wave signal from the millimeter-wave module to the antenna element on the metal frame. The coexistence of sub-6 GHz antennas with millimeter-wave antennas enables communication, by the electronic device, in 5G and beyond 5G cellular networks and wireless area networks.

These and other aspects of the present disclosure will be apparent from the exemplary embodiments described below.

BRIEF DESCRIPTION OF THE DRAWINGS

In the following detailed portion of the present disclosure, exemplary aspects, embodiments and implementations will be explained in more detail with reference to the drawings, in which.

DETAILED DESCRIPTION

Figure 1A:
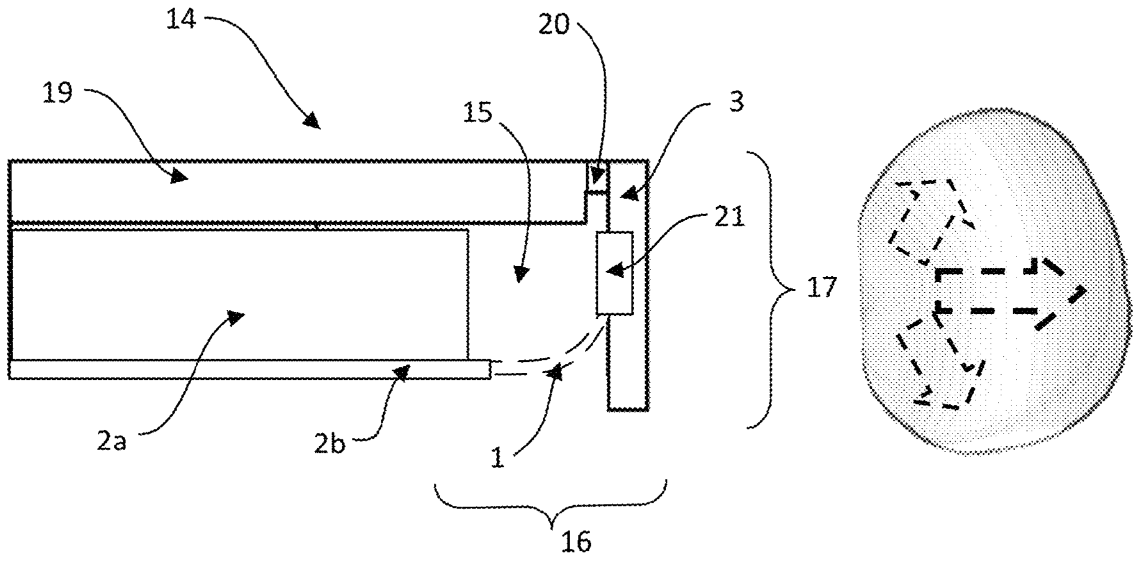
FIG. 1*a* shows a schematic cross-sectional illustration of an electronic device in accordance with an embodiment of the present disclosure.
Figure 1B:
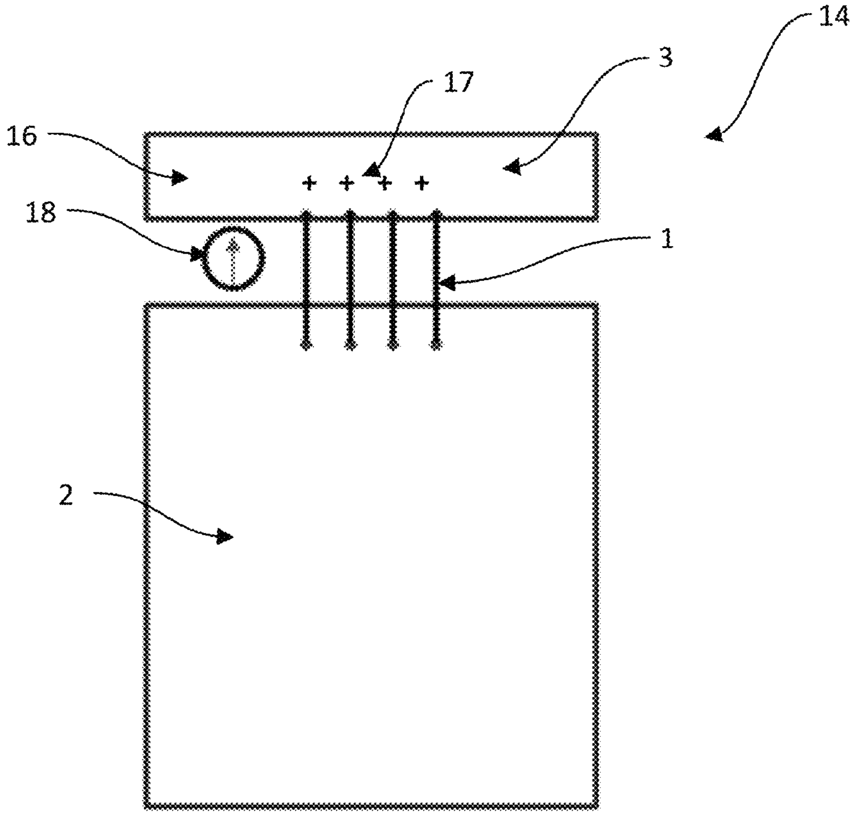
FIG. 1*b* shows a schematic top view of the embodiment of FIG. 1*a;*

FIGS. 1*a*-1*b* shows an electronic device 14 comprising a display 19, a first conductive element 2, a second conductive element 3, a first antenna 16, and a second antenna 17. The first conductive element 2 may be a device chassis 2*a* or a printed circuit board (PCB) 2*b*, and the second conductive element 3 may be a metal frame. The display 19 and the metal frame 3 may at least partially surround the device chassis 2*a* and the printed circuit board 2*b*. Radiofrequency radiation generated by the first antenna 16 and the second antenna 17 may be transmitted through a dielectric gap 20 separating the display 19 and the metal frame 3.

The first conductive element 2 and the second conductive element 3 are separated by a non-conductive volume 15, the first antenna 16 and the second antenna 17 are configured at least partially within the non-conductive volume 15 and/or the second conductive element 3. A first transmission line 18 connects the first conductive element 2 to the first antenna 16 across the non-conductive volume 15, and at least one second transmission line 1, described in more detail further below, connects the first conductive element 2 to the second antenna 17 across the non-conductive volume 15. Each second transmission line 1 introduces a parasitic capacitive load below 0.2 pF to a space formed by the non-conductive volume 15.

In one embodiment, the first antenna 16 is a sub6-GHz antenna, and hence the first transmission line 18 is a sub6-GHz feed. In a further embodiment, the second antenna 17 is at least one millimeter-wave antenna. A plurality of second antennas 17 may form an antenna array. A millimeter-wave antenna module 21 may be arranged between the first conductive element 2 and the second conductive element 3.

The above-mentioned transmission line 1 is adapted for transmitting radiofrequency range current between the first conductive element 2 and the second conductive element 3. The transmission line 1, shown in FIGS. 3*a*-6, comprises a signal current line 4 and at least one return current line 5, the signal current line 4 and the return current lines 5 extending in parallel. The transmission line 1 introduces a very low capacitive load to the first antenna 16 which enables feeding the second antenna 17, the millimeter-wave antenna, without degrading the performance of the first antenna 16, the sub6-GHz antenna, allowing both antennas to coexist within the same space.

Both the signal current line 4 and the return current line 5 comprises at least one first segment 6 and at least one second segment 7, arranged such that each first segment 6 is partially aligned with at least one adjacent second segment 7, and such that aligned segments are separated by a first dielectric gap 8. Each aligned first segment 6 and second segment 7 forms a capacitive coupling across the first dielectric gap 8. The return current line 5 is part of the ground used for the second antenna 17. Conventionally, return current line 5 are not provided with dielectric gaps since such an interruption in current is undesired due to it generating unintentional radiation which reduced the efficiency of the element comprising the return current line 5. However, in the present solution, such radiation forms part of the radiofrequency radiation generated by the first antenna 16 and the second antenna 17.

Figure 2:
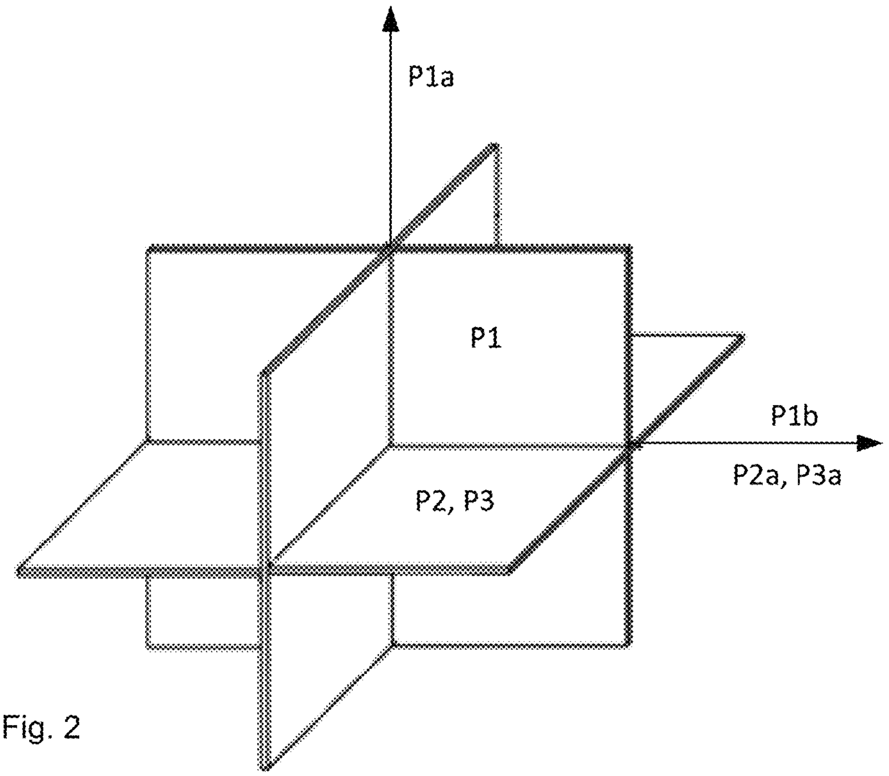
FIG. 2 shows a perspective view of the planes of an embodiment of the present disclosure.
Figure 3A:
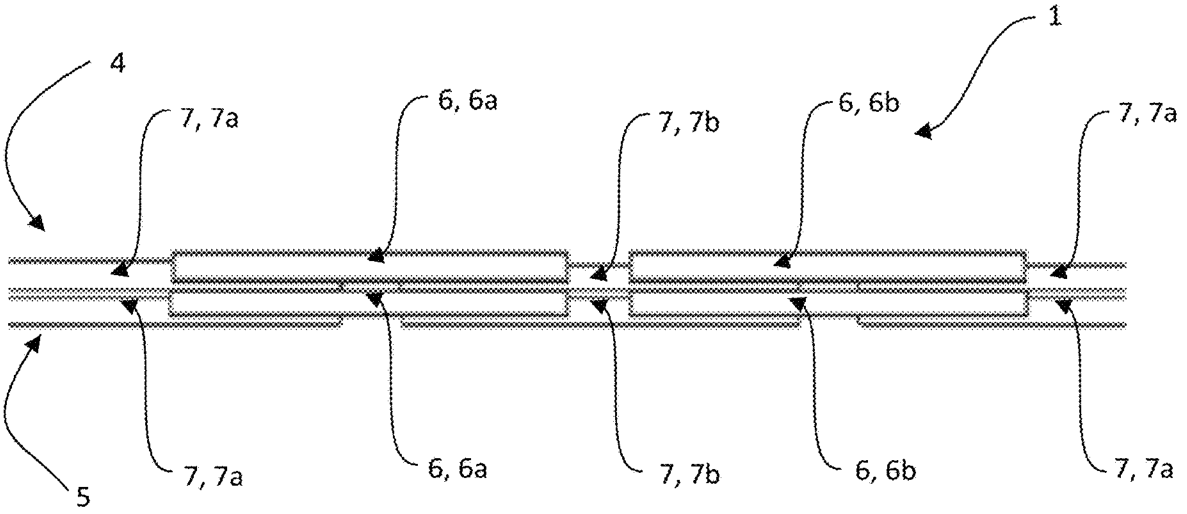
FIG. 3*a* shows a perspective view of a transmission line in accordance with an embodiment of the present disclosure.
Figure 3B:
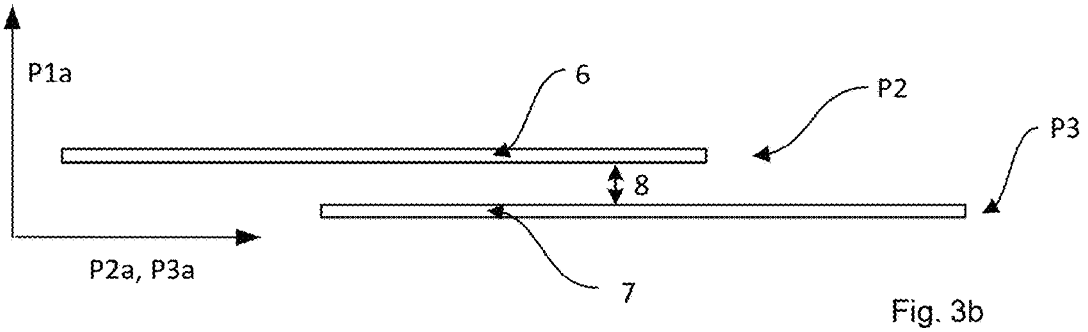
FIG. 3*b* shows a side view of the embodiment of FIG. 3*a;*
Figure 3C:
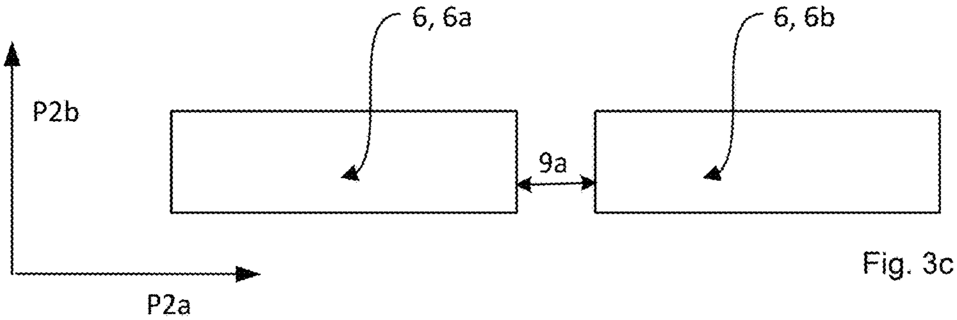
FIG. 3*c* shows a top view of a part of the embodiment of FIGS. 3*a*-3*b;*
Figure 3D:
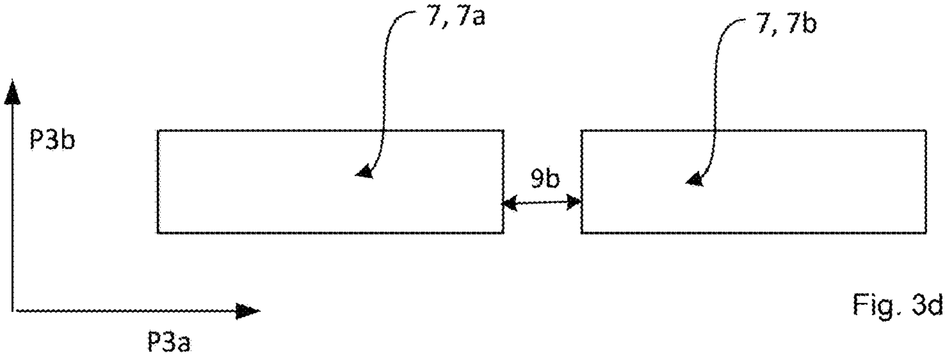
FIG. 3*d* shows a top view of a further part of the embodiment of FIGS. 3*a*-3*b;*
Figure 4A:
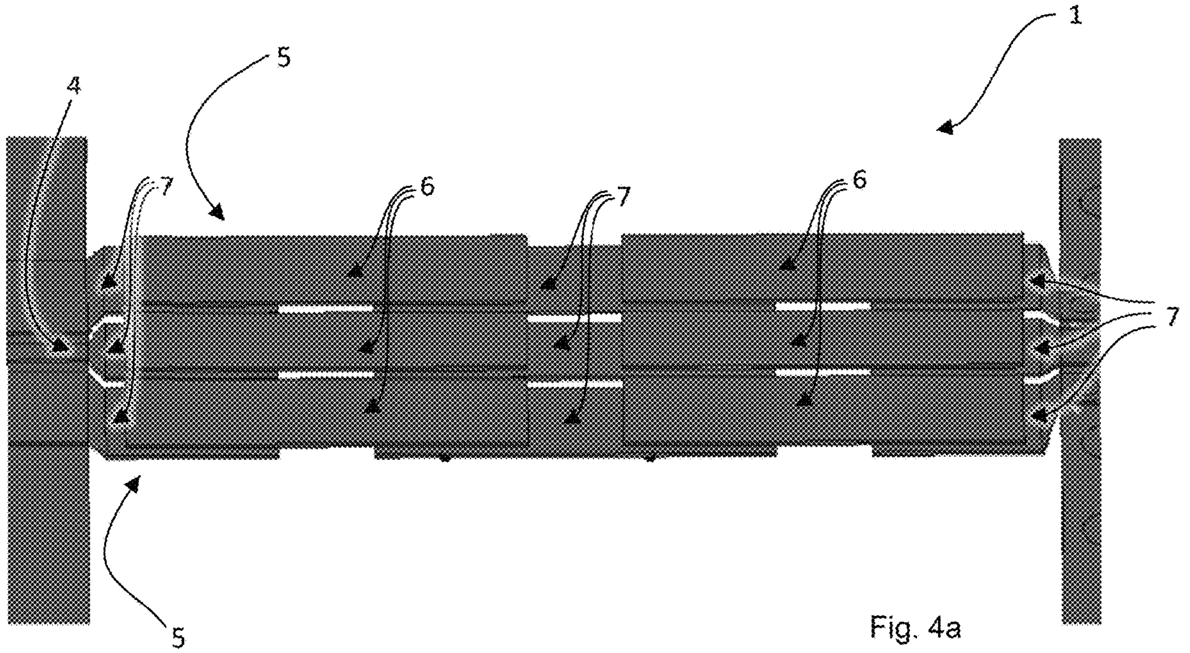
FIG. 4*a* shows a perspective view of a transmission line in accordance with a further embodiment of the present disclosure.
Figure 4B:
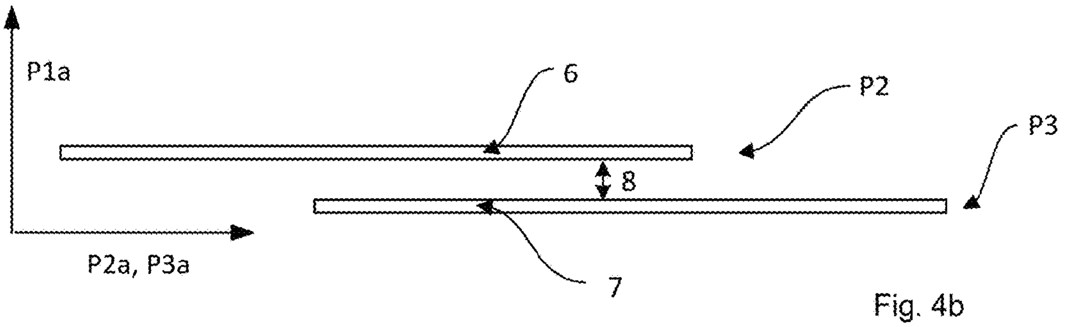
FIG. 4*b* shows a side view of the embodiment of FIG. 4*a;*
Figure 4C:
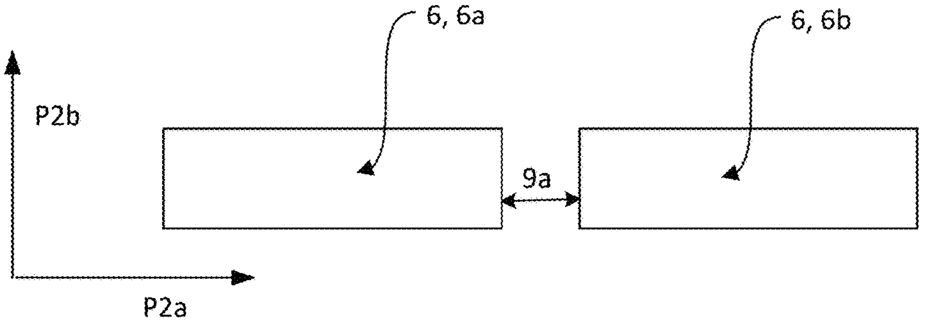
FIG. 4*c* shows a top view of a part of the embodiment of FIGS. 4*a*-4*b;*
Figure 4D:
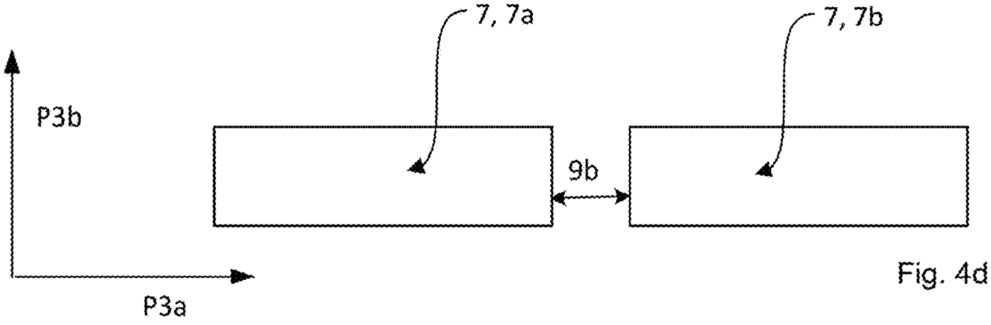
FIG. 4*d* shows a top view of a further part of the embodiment of FIGS. 4*a*-4*b;*

The first segments 6 and the second segments 7 may be arranged in a first plane P1, the planes referred to below being best shown in FIG. 2. Each first segment 6 partially overlaps at least one adjacent second segment 7, such that aligned and overlapping segments are separated by the first dielectric gap 8 in a first direction P1*a* within the first plane P1. Each overlap between a first segment 6 and a second segment 7 may generate an electromagnetic coupling enabling transmission above 10 GHz frequencies and which generates electromagnetic isolation, between the first segment 6 and the second segment 7, below 10 GHz. This is achieved by minimizing the common mode capacitance of the transmission line 1, which is done introducing series capacitances<0.05 pF, i.e. dielectric gaps, to the transmission line 1. The above-mentioned millimeter-wave antenna 17 array may have 4 to 8 transmission lines, in which case the parasitic capacitance of each transmission line should be below 0.1 pF to 0.2 pF.

In one embodiment, each first segment 6 and each second segment 7 has a longitudinal extension, with lengths optimized to compensate for the series capacitances within the pass band. In one embodiment, the lengths are between $\lambda/16$ and $3*\lambda/4$, $\lambda$ being a wavelength within the radiofrequency range of the millimeter-wave antenna 17. The series capacitances are compensated by the comparatively short dimensions of the first segments 6 and the second segments 7. In some embodiments, the operating frequency range of the millimeter-wave antenna 17 is within the 24 GHz to 70 GHz range. For example, the longitudinal extension of each first segment 6 and each second segment 7 may be 0.5 mm to 2 mm for the frequency bands 24 GHz to 29.5 GHz.

The first segments 6 may further extend in a second plane P2 and the second segments 7 may further extend in a third plane P3, the second plane P2 being parallel with the third plane P3, and the second plane P2 and the third plane P3 being perpendicular to the first plane P1.

In some embodiments, each first segment 6*a* is separated from an adjacent first segment 6*b* by a second dielectric gap 9*a* in a first direction P2*a* within the second plane P2, and each second segment 7*a* is separated from an adjacent second segment 7*b* by a second dielectric gap 9*b* in a first direction P3*a* within the third plane P3.

The first segments 6 of the signal current line 4 and the first segments 6 of the return current lines 5 may extend in parallel in the second plane P2, and the second segments 7 of the signal current line 4 and the second segments 7 of the return current lines 5 may extend in parallel in the third plane P3, as shown in FIGS. 3*a*-3*d* and 4*a*-4*d*.

Figure 7:
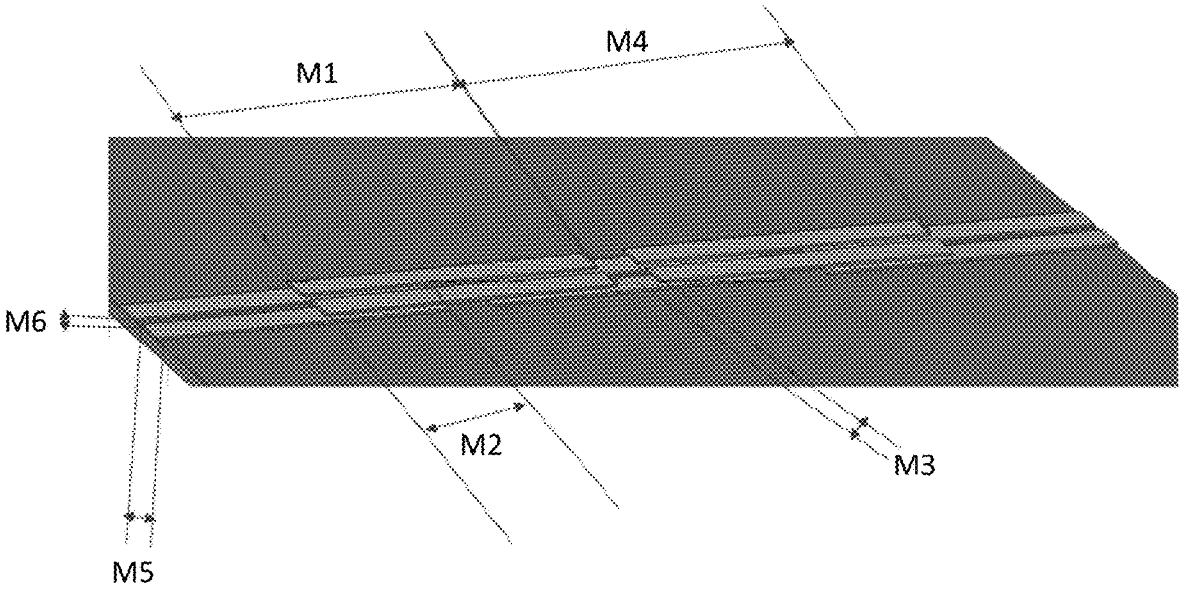
FIG. 7 shows dimensions of the embodiment of FIGS. 3*a*-3*d.*

FIG. 7 indicates approximate dimensions for the different elements of the transmission line 1 shown in FIGS. 3*a*-3*d*, which dimensions are explained in more detail in the table below.

| Dimension | Length | Description |
|---|---|---|
| M1 | $<\lambda/4$ | Short inductive transmission line compensates for the introduced capacitance. |
| M2 | $\sim\lambda/8$-$\lambda/50$ | Coupled segments between transmission lines will affect the capacitive loading introduced and will define the insertion loss at mm-wave frequencies. |
| M3 | $\sim\lambda/4$ | Distance between coupled segments in different planes will determine the capacitive loading introduced and will define the insertion loss at mm-wave frequencies. |
| M4 | $\sim\lambda/4$ | Inductive sections period. |
| M5 | — | Width of each line. Defines the differential mode impedance and common mode capacitance. |
| M6 | — | Distance between the lines. Defines differential mode impedance. |

Figure 5A:
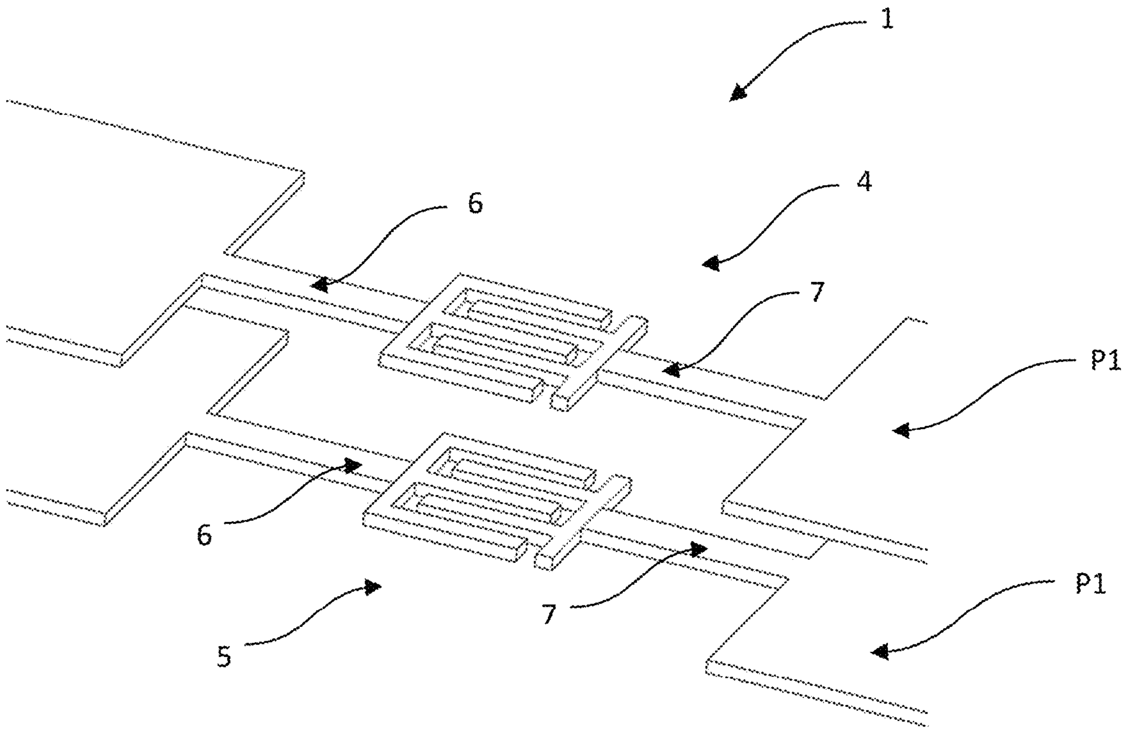
FIG. 5*a* shows a perspective view of a transmission line in accordance with yet another embodiment of the present disclosure.
Figure 5B:
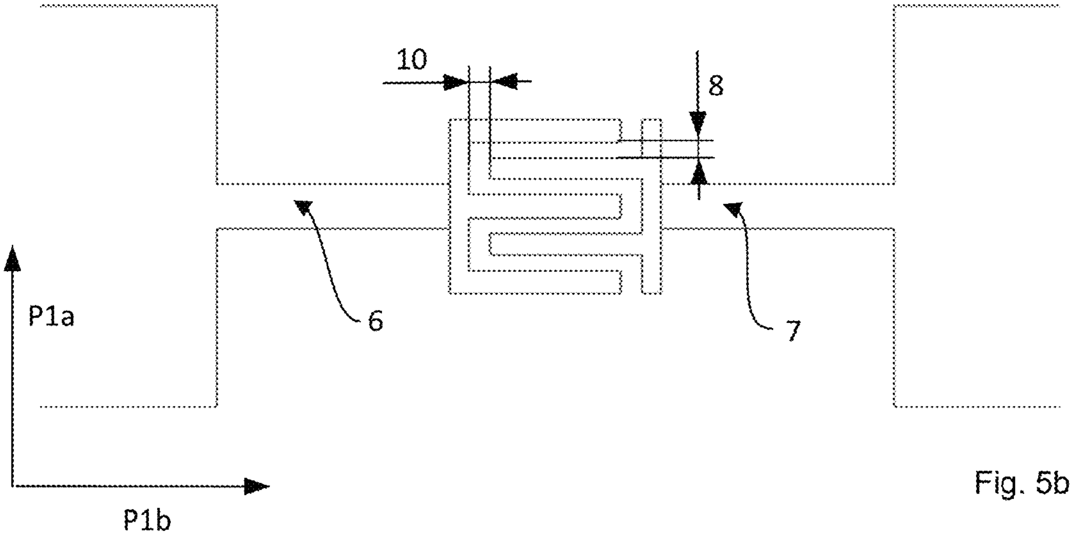
FIG. 5*b* shows a top view of a part of the embodiment of FIG. 5*a;*

As shown in FIGS. 3*a*-3*d* and 5*a*-5*b*, the transmission line 1 may be a balanced transmission line 1 without a ground plane, comprising one signal current line 4 and one return current line 5. FIGS. 3*a*-3*d* show an embodiment where both current lines 4, 5 extend in both planes P2 and P3, which planes are arranged in parallel. FIGS. 5*a*-5*b* show an embodiment where the current lines 4, 5 extend in one plane P1 each, the two planes P1 extending in parallel.

As shown in FIGS. 5*a*-5*b*, each current line 4, 5 may comprise one first segment 6 and one second segment 7, the first segment 6 being additionally separated from the second segment 7 by a third dielectric gap 10 in a second direction P1*b* within the first plane P1, the second direction P1*b* being perpendicular to the first direction P1*a*. Such an embodiment may be a so-called n-stage inter-digital capacitor.

In one embodiment, shown in FIGS. 4*a*-4*d*, the transmission line 1 comprises one signal current line 4 and two return current lines 5, the signal current line 4 extending between the two return current lines 5. The arrangement may be symmetrical, but is not balanced. This embodiment may be a so-called coplanar waveguide transmission line (CPW).

Figure 6A:
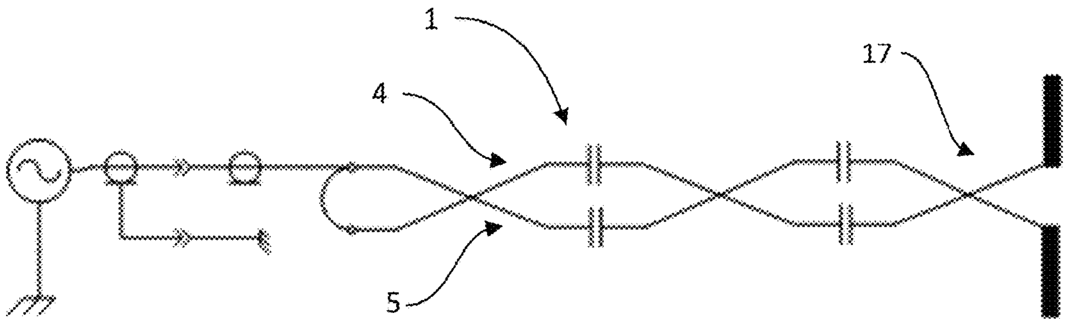
FIG. 6*a* shows a circuit model of the embodiments shown in FIGS. 3*a*-3*d* and 5*a*-5*b;*
Figure 6B:
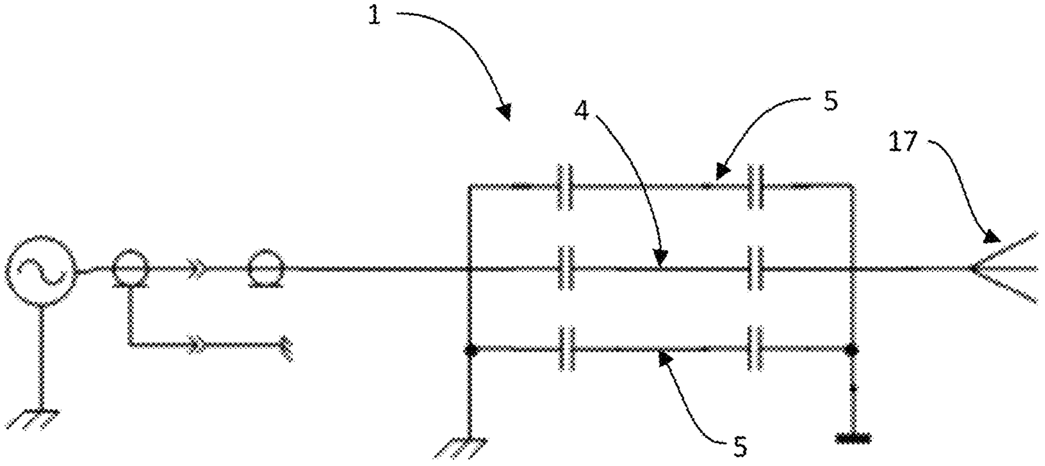
FIG. 6*b* shows a circuit model of the embodiment shown in FIGS. 4*a*-4*d;*
Figure 6C:
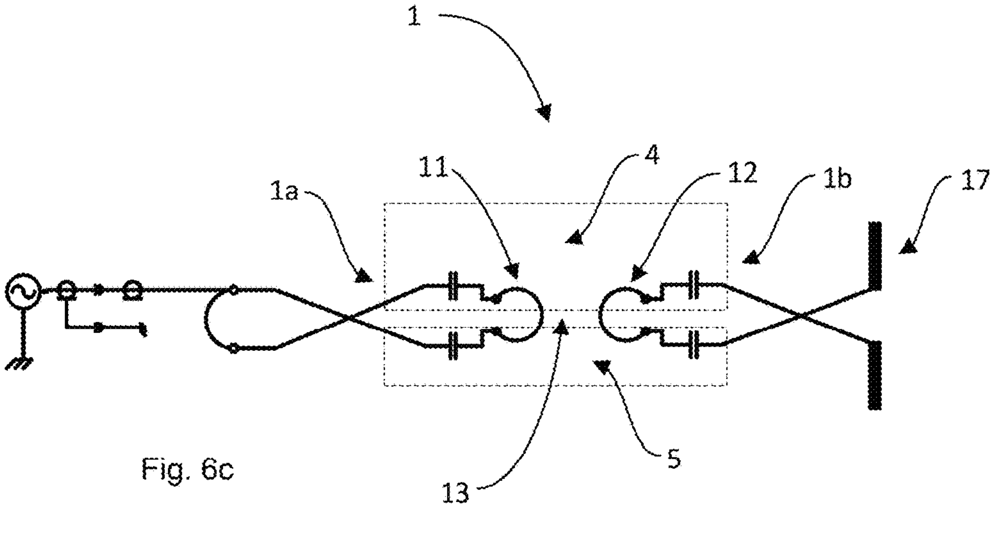
FIG. 6*c* shows a circuit model comprising a transmission line in accordance with a further embodiment of the present disclosure.

FIGS. 6*a*-6*c* show circuit model of the different embodiments, all models comprising, except for the elements indicated by reference numerals, a ground, a stripline, and at least one balun. FIG. 6*a* shows a circuit model of the embodiment shown in FIGS. 3*a*-3*d* and 5*a*-5*b*, and FIG. 6*b* shows a circuit model of the embodiment shown in FIGS. 4*a*-4*d.*

FIG. 6*c* shows a further embodiment wherein the signal current line 4 and the return current line 5 are connected by a first conductive structure 11 and a second conductive structure 12. A transmission line gap 13 extends between the first conductive structure 11 and the second conductive structure 12, such that the transmission line gap 13 divides the transmission line 1 into a first transmission line part 1*a* and a second transmission line part 1*b*. The first conductive structure 11 and the second conductive structure 12 together form an inductive coupling between the first transmission line part 1*a* and the second transmission line part 1*b*. Both the signal current line 4 and return current line 5 include reactive matching segments, configured for impedance matching of the lines with the conductive structures and reduction of the return loss within the frequency pass band. The reactive matching segments are implemented as planar or interdigital capacitors.

Various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Reference signs used in the claims shall not be construed as limiting the scope.

What is claimed is:

1. An electronic device comprising:

a first conductive element and a second conductive element separated by a non-conductive volume;

a first antenna and a second antenna configured at least partially within the non-conductive volume and/or the second conductive element;

a first transmission line connecting the first conductive element to the first antenna across the non-conductive volume; and a second transmission line connecting the first conductive element to the second antenna across the non-conductive volume, wherein the second transmission line comprises:

a signal current line; and at least one return current line;

wherein the signal current line and the return current line(s) extend in parallel;

wherein each of the signal current line and the return current line(s) comprises at least one first segment and at least one second segment, wherein each first segment is partially aligned with at least one adjacent second segment;

wherein a respective first segment and a respective second segment are separated by a first dielectric gap and form a capacitive coupling across the first dielectric gap.

2. The electronic device according to claim 1, wherein the first segment(s) and the second segment(s) are arranged in a first plane, wherein each first segment partially overlaps with at least one adjacent second segment, and wherein two segments which are aligned and overlapping are separated by the first dielectric gap in a first direction within the first plane.

3. The electronic device according to claim 2, wherein each overlap between a respective first segment and a respective second segment generates an electromagnetic coupling enabling transmission above 10 GHz frequencies, and wherein electromagnetic isolation is provided between the respective first segment and the respective second segment below 10 GHz frequencies.

4. The electronic device according to claim 1, wherein each first segment and each second segment has a longitudinal extension of λ/16 to 3*λ/4, wherein λ is a wavelength within the radiofrequency range.

5. The electronic device according to claim 2, wherein the first segment(s) further extend in a second plane and the second segment(s) further extend in a third plane, wherein the second plane is parallel with the third plane, and wherein the second plane and the third plane are perpendicular to the first plane.

6. The electronic device according to claim 5, wherein each first segment is separated from an adjacent first segment by a second dielectric gap in a first direction within the second plane, and each second segment is separated from an adjacent second segment by a second dielectric gap in a first direction within the third plane.

7. The electronic device according to claim 5, wherein the first segment(s) of the signal current line and the first segment(s) of the return current line(s) extend in parallel in the second plane, and the second segment(s) of the signal current line and the second segment(s) of the return current line(s) extend in parallel in the third plane.

8. The electronic device according to claim 1, wherein the second transmission line has only one signal current line and one return current line.

9. The electronic device according to claim 2, wherein each of the signal current line and the return current line(s) has only one first segment and one second segment, wherein the respective first segment is additionally separated from the respective second segment by a third dielectric gap in a second direction within the first plane, and wherein the second direction is perpendicular to the first direction.

10. The electronic device according to claim 1, wherein the second transmission line comprises one signal current line and two return current lines, wherein the signal current line extends between the two return current lines.

11. The electronic device according to claim 1, wherein the signal current line and the return current line(s) are connected by the first conductive element and the second conductive element, wherein a transmission line gap extends between the first conductive element and the second conductive element, wherein the transmission line gap divides the second transmission line into a first transmission line part and a second transmission line part, and wherein the first conductive element and the second conductive element form an inductive coupling between the first transmission line part and the second transmission line part.

12. The electronic device according to claim 1, further comprising:

a display;

wherein the first conductive element is a device chassis or a printed circuit board;

wherein the second conductive element is a metal frame;

wherein the display and the metal frame at least partially surround the device chassis and the printed circuit board; and wherein radiofrequency radiation generated by the first antenna and the second antenna is transmitted through a dielectric gap separating the display and the metal frame.

13. The electronic device according to claim 1, wherein the first antenna is a sub-6-GHz antenna.

14. The electronic device according to claim 1, wherein the second antenna is a millimeter-wave antenna, and wherein a millimeter-wave antenna module is arranged between the first conductive element and the second conductive element.

15. The electronic device according to claim 1, wherein the first antenna and the second antenna are configured at least partially within the second conductive element.

* * * * *